United States Patent
Tomita et al.

[11] Patent Number: 5,780,177
[45] Date of Patent: Jul. 14, 1998

[54] MAGNETIC THIN FILM AND THIN FILM MAGENETIC ELEMENT USING THE SAME

[75] Inventors: Hiroshi Tomita, Tokyo; Tetsuhiko Mizoguchi, Yokohama, both of Japan

[73] Assignee: Kabushiki Kaisha Toshiba, Kawasaki, Japan

[21] Appl. No.: 721,722

[22] Filed: Sep. 26, 1996

[30] Foreign Application Priority Data

Sep. 28, 1995 [JP] Japan ................................ 7-251334

[51] Int. Cl.$^6$ .................................................... G11B 5/66
[52] U.S. Cl. ............................. 428/692; 428/694 RE; 428/694 T; 428/678; 428/685; 428/900; 148/304; 148/305
[58] Field of Search ....................... 428/692, 678, 428/685, 694 T, 900, 694 RE; 148/304, 305

[56] References Cited

U.S. PATENT DOCUMENTS 4,921,763  5/1990  Karamon ............................. 428/692

FOREIGN PATENT DOCUMENTS 59-202614  11/1985  Japan .
2 147 751  5/1995  United Kingdom .

OTHER PUBLICATIONS

Patent Abstracts of Japan, vol. 009, No. 065, Mar. 26, 1985 & JP-A-59 202614, Nov. 16, 1984, (Abstract).
Journal of Magnetism and Magnetic Materials, Sabolek et al., "Reduction of Loss in Composite Magnetic Material", vol. 110, No. 1/02, Apr. 1, 1992 pp. L25–L28.
H. Karamon, "A New Type of High–Resistive Soft Magnetic Amorphous Films Utilized for a Very High–Frequency Range", J. Appl. Phys. 63(8), 15 Apr. 1988.

*Primary Examiner*—Leszek Kiliman
*Attorney, Agent, or Firm*—Finnegan, Henderson, Farabow, Garrett & Dunner, L.L.P.

[57] ABSTRACT

A magnetic thin film is disclosed which has a composition represented substantially by the following chemical formula and, the same time, has the whole or part of the thin film formed of an amorphous region:

$$\{(Fe_{1-x}Co_x)_{1-y}(B_{1-z}X_z)_y\}_{1-a}RE_a$$

wherein X represents at least one element selected from among the Group 4B elements in the CAS version of the Periodic Table, RE represents rare earth elements including Sm, and x, y, z, and a represent numerical values satisfying the following expressions, $0<x<1$, $0<z<1$, $0.05<y<0.36$, and $0<a\leq 0.1$.

8 Claims, 3 Drawing Sheets

11  12

A ←→ (DIRECTION OF AXIS OF EASY MAGNETIZATION)

MAGNETIC THIN FILM AND THIN FILM MAGENETIC ELEMENT USING THE SAME

BACKGROUND OF THE INVENTION

1. Field of the Invention

This invention relates to a magnetic thin film to be used for such planar magnetic elements as, for example, planar inductors and planar transformers and a thin film element using the magnetic thin film.

2. Description of the Related Art

In recent years, the miniaturization of various electronic devices has been being promoted strenuously. The miniaturization of power source parts of the electronic devices, however, has been advancing slowly by comparison. The volume ratio of such power source parts to their relevant devices proper has been steadily on the increase. The miniaturization of electronic devices owes greatly to the evolution of LSI's for various circuits. Such magnetic parts as inductors and transformers which are essential to the power source parts, however, have been delayed in miniaturization and circuit integration. This delay constitutes itself a main cause for the increase in the volume ratio mentioned above.

For the solution of this problem, planar magnetic elements which combine planar coils with magnetic members have been proposed. A study is now under way with a view to improving the planar magnetic elements in performance. The magnetic thin films to be used in the planar magnetic elements are required to have low loss and enjoy high saturation magnetization in a high frequency zone exceeding 1 MHz. In the high frequency zone, the permeability is chiefly obtained during the process of rotational magnetization. For the acquisition of an ideal process of rotational magnetization, the excitation must be made in the direction of the axis of hard magnetization under the condition of uniform inplane uniaxial magnetic anisotropy. The permeability, coercive force, and the like in the direction of the axis of hard magnetization constitute themselves the important physical properties.

The permeability in the high frequency zone is a magnitude which is related complicatedly to the various physical properties of a sample. As the most related of these physical properties, the anisotropic magnetic field is cited. The permeability in the high frequency zone is roughly proportional to the reciprocal of the anisotropic magnetic field. In such magnetic elements as, for example, a thin film inductor, the optimum permeability varies, depending on the particular design of an element. For the purpose of enabling a magnetic element like a thin film inductor to realize high permeability suitable therefor in a high frequency zone, therefore, the magnetic element must possess uniaxial anisotropy within the plane of the magnetic film and also possess an ability to control the anisotropic magnetic field.

Further, since the magnetic element like a thin film inductor can expect the electric power and the saturated current available therefor to be exalted in proportion as the saturation magnetization of the magnetic film is increased, high saturation magnetization is also necessary for the magnetic film used in the magnetic element like a thin film inductor. It is natural that a magnetic thin film satisfying both the requirements of low loss and high saturation magnetization in a high frequency zone is effective in a thin film magnetic head as the recording density is increased and the coercive force, energy integral, and operating frequency of the medium are heightened. These requirements generally apply to the other magnetic elements.

When the magnetic thin film mentioned above is used in the form of a single layer or a laminate in the magnetic element like a thin film inductor, the magnetic properties thereof are varied to a certain extent from those inherent in the individual magnetic thin film. This variation has been posing a problem.

When numerous magnetic elements are formed on a substrate by the standard thin film processing technique, it often happens that the magnetic thin film is underlaid by either one layer or a laminate of a plurality of layers, selected from among resin layer, insulating undercoating film layer, electroconductive metal film layer, protective film layer, adhesive film layer, and mask grade layer intended for the work of patterning besides a substrate wafer. It is also common that such various layers as mentioned above are superposed on the magnetic thin film after this magnetic thin film has been formed completely. For the formation of each of these layers, such steps as PVD or CVD, plating, application by the use of a spin coater, and baking for the sake of curing are sequentially carried out. Even when the film formation on the substrate at an elevated temperature is not involved at the step of PVD or CVD, the temperature rise to a certain extent generally occurs during the deposition of a film.

Further, the magnetic film and part or the whole of the component layers as well must be subjected to the patterning work for the purpose of implementing the formation of electrodes, the formation of slits in the magnetic film, the formation of through holes, the separation of the component elements, and the designing of magnetic circuits. Generally, the patterning work is carried out by the steps of forming a mask by any of various techniques available therefor and dry etching or wet etching a pertinent layer with the aid of the mask.

More often than not, the various treatments possibly result in impairing the flatness and smoothness of the surface or interface of the magnetic thin film and causing a change in shape such as through the introduction of a periodic undulation. Since the stress which is exerted in the form of contacting force on the magnetic thin film through the surface or interface is varied and this stress is also varied in magnitude and direction from one place to another of the film. Frequently, the stress is dispersed in the two factors, magnitude and direction. The change in shape and the change in stress both affect the magnetic properties of the magnetic thin film. Particularly, the latter change demands the greatest attention from the viewpoint of homogenizing necessary magnetic characteristics to the magnetic thin film and controlling the homogenous magnetic characteristics and also from the viewpoint of enabling the magnetic thin film to retain soft magnetism.

The magnetic anisotropy of the magnetic thin film responds to the strain caused in the magnetic thin film by stress. When anisotropic stress is generated, magnetic anisotropy which corresponds thereto is consequently induced. When the dispersion of stress mentioned above occurs, the magnetic anisotropy is induced to be dispersed in response to the dispersion of stress. This dispersion of the magnetic anisotropy generally increases the coercive force and impairs the soft magnetism of the magnetic thin film. The energy of the induced magnetic anisotropy is proportional to the magnetostriction constant.

For the purpose of enabling the magnetic thin film in a thin film magnetic element to manifest necessary magnetic properties as designed, therefore, it is necessary either to decrease the anisotropic stress induced by the process of manufacture of the magnetic element or to utilize positively the anisotropic stress generated by the through process of the individual magnetic element for the control of the anisotropy. The positive utilization of the anisotropic stress for the control of anisotropy, however, is technically difficult. The control of this nature is not easily realized. As respects the dispersion of magnetic anisotropy which impairs the soft magnetism, it is necessary either to elucidate the mechanism of this dispersion and lower the dispersion itself or to decrease the intrinsic stress itself.

These measures are approaches from the manufacturing process side. From the magnetic thin film side, the decrease of the magnetostriction constant forms an effective countermeasure. The material of the magnetic thin film for use in the thin film magnetic element more often than not has a relatively large magnetostriction constant when it fulfills such requirements as high saturation magnetization and thorough inplane uniaxial magnetic anisotropy which the magnetic thin film is expected to possess. Since the spontaneous magnetization is decreased when such a substance as Si is added in a stated amount for the sake of diminishing positive magnetostriction, it is necessary to effect the decrease of the magnetostriction while repressing to the smallest possible limit the spontaneous magnetization decrease meanwhile.

As mentioned above, the magnetic elements adapted for miniaturization are badly in need of a magnetic thin film which possesses a small magnetostriction constant and exhibits such magnetic properties as are not readily affected by the process of manufacture of a magnetic element while fulfilling the requirements, i.e. high saturation magnetization of the magnetic layer, soft magnetism, and ability to control inplane uniaxial magnetic anisotropy.

SUMMARY OF THE INVENTION

This invention, undertaken for the purpose of fulfilling the task and intended particularly to diminish the magnetostriction without impairing the high saturation magnetization, aims to provide a magnetic thin film which possesses a small magnetostriction constant and exhibits such magnetic properties as are not readily affected by the process of manufacture of a magnetic element while fulfilling the requirements, i.e. high saturation magnetization of the magnetic layer, soft magnetism, and ability to control inplane uniaxial magnetic anisotropy and a thin film magnetic element using the magnetic thin film.

The magnetic thin film of this invention is characterized by being formed of a magnetic substance comprising a transition metal consisting of Fe and Co, B, at least one element selected from among the Group IVB elements such as, C, Si, and Sn in the IUPAC version of the Periodic Table, rare earth elements including Sm, and inevitable impurities and satisfying the following compositional formula and the whole or part of the region of construction comprising an amorphous region.

Compositional formula: $\{(Fe_{1-x}Co_x)_{1-y}(B_{1-z}X_z)_y\}_{1-a}RE_a$ wherein X represents at least one element selected from among the Group IVB elements in the IUPAC version of the Periodic Table, RE represents rare earth elements including Sm, and x, y, z, and a satisfy the following expressions, $0<x<1$, $0<z<1$, $0.05<y<0.36$, and $0 \leq a<0.1$.

With the construction satisfying this composition, this invention realizes a soft magnetic thin film which retains high saturation magnetization, low loss, and ability to control inplane uniaxial magnetic anisotropy and, at the same time, suffers the magnetic properties thereof to be varied and deteriorated only slightly by the stress exerted by the manufacturing process of an element on the magnetic film during or after the manufacture and a thin film magnetic element using the soft magnetic thin film.

Now, the manner for implementing this invention will be described below.

The magnetic thin film of the present invention possesses a composition substantially represented by the compositional formula mentioned above and has the whole or part of the region of the construction of the film formed of an amorphous region. The transition metal consisting of Fe and Co which is a component for supporting magnetism may be Fe alone, Co alone, or an Fe—Co combination. It is particularly advantageous to use the Fe—Co combination because this combination acquires a high saturated magnetic flux density and, at the same time, exhibits a high Curie temperature.

B and the Group IVB elements such as C, Si, and Sn in the IUPAC version of the Periodic Table constitute a component which promotes the impartation of an amorphous texture to the magnetic thin film and, at the same time, contributes to the improvement of the temperature of crystallization and the magnetic anisotropy. If the amount of this component is unduly small, the necessary effects will not be obtained. If the amount of this component plus the transition metal mentioned above exceeds 36 at %, the decrease of spontaneous magnetization will be conspicuous and the magnetic properties aimed at will not be easily acquired.

The rare earth elements including Sm are the elements which, when added even in a minute amount, lower the positive magnetostriction without substantially impairing the soft magnetic properties of the thin film. When they are added in an unduly large amount, the spontaneous magnetization will be possibly degraded. Appropriately, the amount of these rare earth elements to be added is in the range of not more than 10 at %, based on the amount of Fe, Co, B, and X mentioned above. Particularly, Sm has a conspicuous effect. Preferably, the amount of Sm is not less than 50% of the total number of mols of the rare earth elements to be added.

The magnetic thin film of this invention has the whole or part of the region of construction thereof formed of an amorphous region and, owing to the amorphousness of the construction, has the magnetic properties thereof improved by decreasing the eddy current loss in the high frequency range. This effect is further exalted when the magnetic thin film is endowed with a hetero-amorphous construction. The region of construction may be amorphous either wholly or partly. In order to obtain a process of rotational magnetization effectively in a high frequency range, it is appropriate that the magnetic thin film should possess uniform uniaxial magnetic anisotropy.

FIG. 1 is a schematic diagram of the construction of a thin film according to this invention. FIG. 1 represents one embodiment of this invention and is not meant to restrict the shape, surface area ratio, etc. of any of the regions of the thin film in any sense. In FIG. 1, 11 represents an amorphous region, a crystalline region, or a mixed amorphous-crystalline region, each containing Fe, Co, and Sm together and 12 represents a region containing B and an element, X, of the Group IVB elements in the IUPAC version of the Periodic Table together. Then, the symbol A macroscopically indicates the direction of the axis of easy magnetization in connection with inplane uniaxial magnetic anisotropy.

First, as the mother phase of a magnetic material which combines high saturation magnetization and soft magnetism, a composition comprising Fe, Co, B, and one or more elements, X, selected from among the Group IVB elements in the IUPAC version of the Periodic Table is adopted.

This mother phase assumes a hetero-amorphous phase or a mixed amorphous-crystalline phase, depending on the composition and the film-forming condition to be suitably selected, and permits induction and control of uniaxial magnetic anisotropy and acquires excellent high frequency magnetic characteristics in addition to exhibiting high saturation magnetization and soft magnetism.

For the purpose of lowering the value of magnetostriction constant, this invention contemplates adding either Sm or rare earth elements containing not less than 50% of Sm to this mother phase.

In the case of an Fe—Co—B—X type hetero-amorphous film or a microcrystalline film, the addition of Sm or rare earth elements containing not less than 50 mol % of Sm proves effective particularly for the sake of lowering positive magnetostriction.

The reduction of the magnetostriction constant due to the addition of Sm or rare earth elements containing not less than 50 mol % of Sm is considered to be proportional substantially linearly to the amount of this addition to the composition.

Appropriately the amount of the rare earth elements to be added is not more than 10 at % from the viewpoint of lowering the absolute value of the magnetostriction constant to below that of the mother phase. Also from the viewpoint of repressing the reduction of the spontaneous magnetization, the addition of rare earth element in an amount exceeding 10 at % proves unfavorable.

The inventor has been ascertained that the reduction of the positive magnetostriction is attained to a certain extent by increasing the amounts of Si and Sn as the elements, X, selected from among the Group IVB elements in the IUPAC version of the Periodic Table to the mother phase. In this case, the increase of the amounts of Si and Sn simultaneously entails a hardly ignorable decrease in the spontaneous magnetization and proves unfavorable for the magnetic thin film for use in a thin film magnetic element.

In contrast, since the addition of Sm or rare earth elements containing not less than 50 mol % of Sm contemplated by this invention is highly effective in decreasing the positive magnetostriction, the reduction of the spontaneous magnetization which is entailed by the addition of Sm or rare earth elements containing not less than 50 mol % of Sm intended to lower the magnetostriction as required is repressed to the least allowable extent.

As demonstrated in the working examples to be cited below, the low coercive force possessed by the mother phase is not found to be impaired by the addition of Sm or rare earth elements containing not less than 50 mol % of Sm.

As respects the local magnetic anisotropy in the region containing Fe and Co and supporting magnetism, since the addition of Sm or rare earth elements containing not less than 50 mol % of Sm results in decreasing the absolute value of the magnetostriction constant, the local magnetic anisotropy is considered to be consequently lowered.

Since the growth of the local magnetic anisotropy degrades the possibility of the development of soft magnetism, it is seen that the addition of Sm or rare earth elements containing not less than 50 mol % of Sm is favorable from the viewpoint of retaining low coercive force and soft magnetism.

So long as Sm is a main component, the effect of the present invention is retained when rare earth elements other than Sm is added simultaneously with Sm. According to the inventor's knowledge, Sm excels all the other elements in terms of effecting the decrease of the magnetostriction. By the simultaneous addition of Sm and other rare earth elements, however, the cost of the starting material is repressed and the provision of an inexpensive magnetic thin film and consequently the provision of an inexpensive thin film magnetic element are facilitated. As a concrete example of the rare earth element which is highly effective as Sm in lowering the magnetostriction, Gd may be cited.

Specifically, the addition of Sm and other rare earth elements is implemented, for example, by preparing a sintered target of mother phase, mounting on the target a chip such as of Sm or a chip of an alloy of a transition metal with Sm, and then co-sputtering the target and the chip or by preparing a target by sintering a material having Sm incorporated in a mother phase and sputtering the target. Alternatively, a film aimed at may be formed by preparing a composition combining a mother phase with Sm, distributing the composition to a multiplicity of targets as divided by elements or by suitable alloy compositions, and then subjecting the targets to the sputtering operation using a multiplicity of sputtering sources or a multiplicity of vacuum evaporation sources, or the combinations thereof. For the production of the film, CVD, flame spraying, rolling, or plating may be adopted besides the PVD mentioned above.

Further to the magnetic thin film mentioned above, uniform inplane uniaxial magnetic anisotropy is imparted. The time and method for the impartation of uniaxial magnetic anisotropy are not particularly limited, though the heat treatment performed in a magnetic field is generally suitable for the impartation under discussion. The formation of the film in a magnetic field during the formation of a magnetic layer, the heat treatment in a magnetic field immediately after the formation of a magnetic film, and the heat treatment in a magnetic field after the manufacture of a magnetic element may be proper methods. Such mechanical methods as the shaping of a substrate before the film formation, the introduction of stress to the film before or after the formation of the film, and the performance of the pattering work by a varying etching technique after the lamination are also conceivable. The technique for generating anisotropic stress in a controlled manner during the process of manufacturing a thin film magnetic element may be otherwise adopted. In consequence of this treatment, the excitation along the axis of hard magnetization adequate for high frequency excitation can be realized.

By the method described above, a magnetic thin film which assumes low magnetostriction and consequently acquires such magnetic characteristics as are sparingly susceptible to the influence of the stress emanating from the other components in the magnetic element, enjoys uniaxial magnetic anisotropy with excellent controllability, and exhibits characteristics such as low loss at high frequency, high saturation magnetization, and soft magnetism can be obtained.

Further, by using the magnetic thin film of this invention as a magnetic substance for magnetic elements such as, for example, the thin film inductor, magnetic substances possessing the optimum magnetic properties required for various magnetic elements and thin film magnetic elements possessing excellent electric and magnetic properties can be realized.

BRIEF DESCRIPTION OF THE DRAWINGS

FIG. 5A representing a plan view, FIG. 5B a plan view of the coil part thereof, and FIG. 5C a cross section thereof.

DESCRIPTION OF THE PREFERRED EMBODIMENTS

Figure 1:
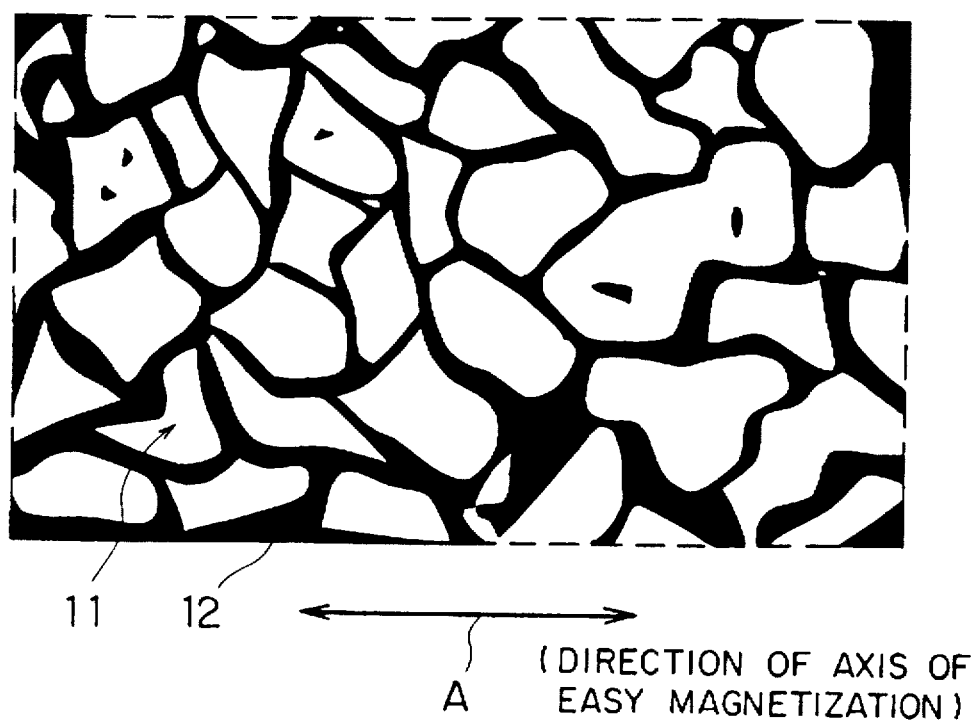
FIG. 1 is a diagram schematically illustrating a magnetic thin film of this invention.

Now, specific working examples of this invention will be described below.

Examples 1–6 and Comparative Examples 1 and 2

Magnetic thin films of the examples and the comparative examples were formed by the use of a magnetron sputtering device under the film-forming conditions shown in Table 1 and Table 2. A Si wafer provided with a thermally oxidized film was used as the substrate. Immediately before the formation of film, the substrate was cleaned by dry etching with Ar gas.

The film consequently formed was heat-treated in a DC magnetic field in a vacuum ambience (DC magnetic field applied: 130 kA/m, temperature of heat treatment: not less than 280° C., and duration of the heat treatment: 2 to 3 hours). The magnetic field for the heat treatment was applied parallelly to the film surface.

TABLE 1

| Mode of film formation | RF magnetron sputtering |
|---|---|
| RF power | 600 W |
| Diameter of target | 127 mm$\phi$ |
| Ar gas pressure during film formation | 0.2 Pa |
| Distance between target and substrate | 105 mm |
| Film thickness | about 1.5 μm |

TABLE 2

| | Example 1 |
|---|---|
| Target | Sintered target of a composition of Fe: 59.2, Co: 21.4, B: 12.3, C: 7.1 Sm chip of the square of 2 mm × 4 p (on target) |
| Composition after film formation | $Fe_{60.5}Co_{22.0}B_{11.0}C_{5.2}Sm_{1.3}$ |
| Crystal structure after film formation | Hetero-amorphous texture |

| | Example 2 |
|---|---|
| Target | Sintered target of a composition of Fe: 59.2, Co: 21.4, B: 12.3, C: 7.1 Sm chip of the square of 2 mm × 2 p (on target) |
| Crystal structure after film formation | Hetero-amorphous texture |

| | Example 3 |
|---|---|
| Target | Sintered target of a composition of Fe: 59.2, Co: 21.4, B: 12.3, C: 7.1 Sm chip of the square of 2 mm × 6 p (on target) |
| Crystal structure after film formation | Hetero-amorphous texture |

| | Example 4 |
|---|---|
| Target | Sintered target of a composition of Fe: 59.2, Co: 21.4, B: 12.3, C: 7.1 Sm chip of the square of 2 mm × 10 p (on target) |
| Crystal structure after film formation | Hetero-amorphous texture |

| | Example 5 |
|---|---|
| Target | $B_4C$ chip 20 mm$\phi$ in diam. × 7 p + Sm chip of the square of 2 mm × 4 p on alloy of Fe 75 – Co 25 |
| Composition after film formation | $Fe_{54.5}Co_{18.2}B_{18.9}C_{7.9}Sm_{0.5}$ |
| Crystal structure after film formation | Hetero-amorphous texture |

| | Example 6 |
|---|---|
| Target | $B_4C$ chip 20 mm$\phi$ in diam. × 5 p + Sm chip of the square of 2 mm × 8 p on alloy of Fe 75 – Co 25 |
| Composition after film formation | Sm 1.2 at % |
| Crystal structure after film formation | Crystalline + Hetero-amorphous texture |

| | Comparative Example 1 |
|---|---|
| Target | Sintered target of a composition of Fe: 59.2, Co: 21.4, B: 12.3, C: 7.1 |
| Composition after film formation | $Fe_{62.7}Co_{22.6}B_{6.6}C_{8.1}$ |
| Crystal structure after film formation | Hetero-amorphous texture |

| | Comparative Example 2 |
|---|---|
| Target | $B_4C$ chip 20 mm$\phi$ in diam. × 7 p. on alloy of Fe 75 – Co 25 |
| Composition after film formation | Sm 0 at % |
| Crystal structure after film formation | Hetero-amorphous texture |

The film thickness was determined with a contact stylus type surface roughness/film thickness meter. The analysis of composition was carried out by an inductively coupled plasma-optical emission analytical spectrometry and an infrared absorption spectrometry under radio-frequency heating. The crystal structure was confirmed by the thin film X-ray diffraction method having the angle of incidence fixed at 2.0 degrees. The spontaneous magnetization, the coercive force, etc. were rated by the measurement of a magnetization curve obtained with a vibrating sample magnetometer.

The magnetostriction was determined visually by the optical lever method using an external magnetic field of not more than 80 kA/m, rotated in a plane containing both an axis of easy magnetization and an axis of hard magnetization. The saturation magnetostriction constant was estimated based on the magnetostriction curves obtained by the optical lever method.

Figure 2:
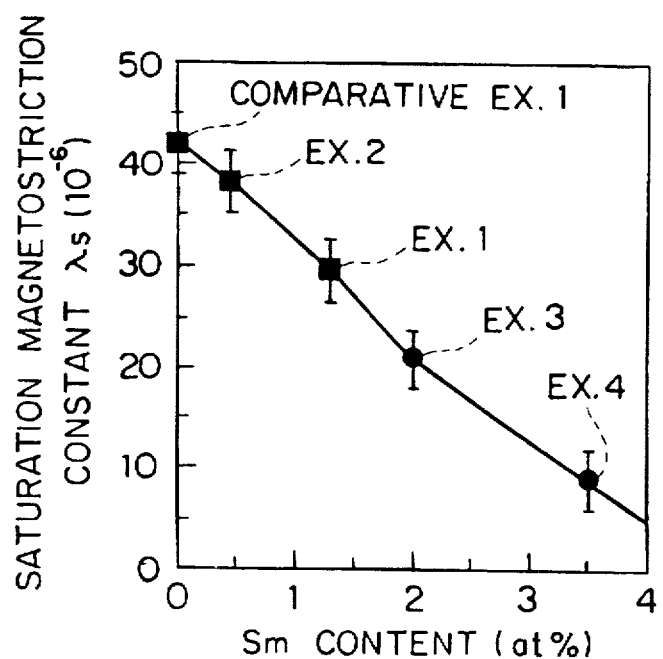
FIG. 2 is a graph showing the dependency of the saturation magnetostriction constant on the compositional ratio of Sm.

FIG. 2 is a diagram showing the dependency of the saturation magnetostriction constant on the Sm composition, obtained of each of the samples of Examples 1 to 4 and Comparative Example 1 prepared by using a sintered target of the same composition.

Figure 3:
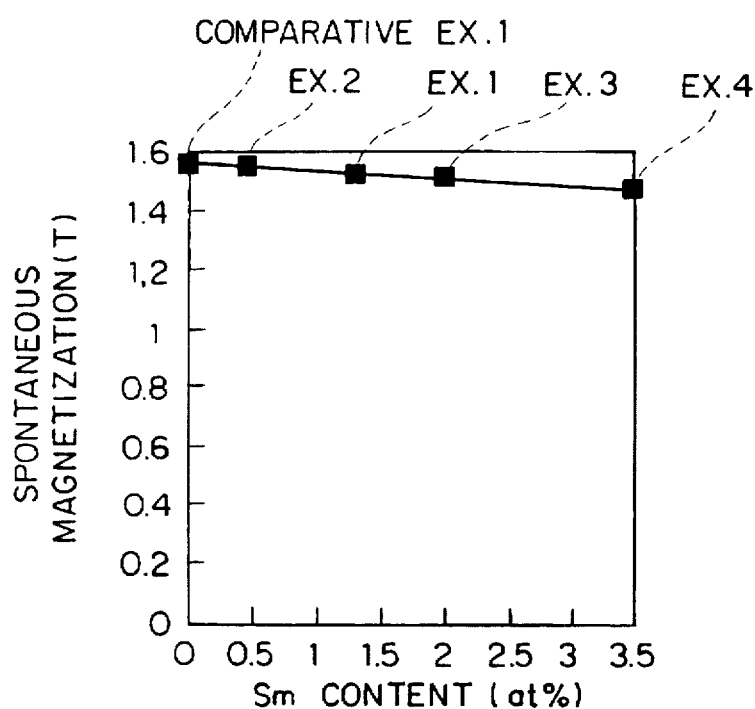
FIG. 3 is a graph showing the dependency of the spontaneous magnetization on the compositional ratio of Sm.

FIG. 3 shows the dependency of the spontaneous magnetization on the Sm composition, obtained of each of the samples.

It is found from FIG. 2 and FIG. 3 that the saturation magnetostriction constant and the spontaneous magnetization were both lowered by the addition of Sm and that the ratio of decrease of the magnetostriction constant was more than 3 times the ratio of decrease of the spontaneous magnetization. The data indicate that the enough decrease of the saturation magnetostriction constant is obtained while repressing the decrease of the spontaneous magnetization to the least possible extent.

Figure 4:
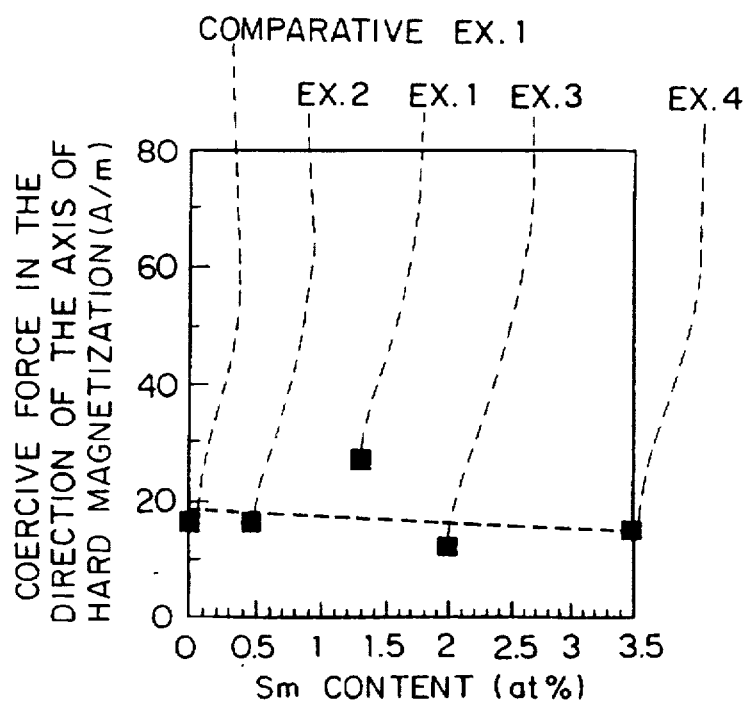
FIG. 4 is a graph showing the dependency of the coercive force along the axis of hard magnetization on the compositional ratio of Sm.

FIG. 4 shows typical results of the determination of the coercive force of each of the samples in the direction of the axis of hard magnetization.

From the results given above, it is found that the retention of fully satisfactory soft magnetism fit for the operation in a high frequency magnetic field is attained by the addition of Sm.

Example 5 and Comparative Example 2 are examples of film formation using a Fe—Co alloy and various chips and invariably producing hetero-amorphous magnetic thin films by the same procedure excepting the presence and the absence of Sm. The saturation magnetostriction constant ($\lambda s$) obtained in Comparative Example 2 was $4.2 \times 10^{-5}$ and that in Example 5 was $3.8 \times 10^{-5}$, indicating that the addition of Sm was effective in lowering the magnetostriction constant without reference to the method of film formation.

Example 6 is an example of film formation using a Fe—Co alloy and various chips as in Example 5. In the present case, the crystal structure consisted of a crystal texture and a hetero-amorphous texture. The saturation magnetostriction constant ($\lambda s$) obtained in this case was $2 \times 10^{-5}$, clearly indicating that even in the mixed crystalline-amorphous phase of the material of this invention, the sample incorporating Sm showed low magnetostriction coefficient.

In Examples 7 and 8 and Comparative Examples 3 and 4, thin film magnetic elements were produced from such magnetic thin films as shown above under the conditions shown in Table 3.

TABLE 3

| Formation of coil film | Cu film by plating method |
|---|---|
| Method of embedding coil film | Application of polyimide by the use of a spin coater |
| Insulation and spacing between laminated magnetic film and coil film | SiO$_2$ by sputtering and polyimide |

In Example 7, magnetic thin films prepared by the procedure of Example 3 and insulating layers of AlN (0.4 µm in thickness) were alternately superposed in four layers and the resultant superposed layers were collectively patterned by etching with a mixed acid.

In Example 8, magnetic thin films prepared by the procedure of Example 3 and insulating layers of AlN (0.4 µm in thickness) were alternately superposed in four layers and the resultant superposed layers were patterned by alternately and sequentially etching the insulating layers and the magnetic layers with two kinds of etchant.

In Comparative Example 3, magnetic thin films prepared by the procedure of Comparative Example 1 and insulating layers of AlN (0.4 µm in thickness) were alternately superposed in four layers and the resultant superposed layers were collectively patterned by etching with a mixed acid.

In Comparative Example 4, magnetic thin films prepared by the procedure of Comparative Example 1 and insulating layers of AlN (0.4 µm in thickness) were alternately superposed in four layers and the resultant superposed layers were patterned by alternately and sequentially etching the insulating layers and the magnetic layers with two kinds of etchant.

A thin film inductor element was obtained in Example 7 by using a laminated magnetic thin film having four AlN insulating layers superposed through the medium of magnetic thin films produced by the procedure of Example 3. The magnetic thin films in the completed inductor element were found to have an anisotropic magnetic field which only showed a deviation within 0.3 kA/m relative to the anisotropic magnetic field of 1.1 kA/m obtained originally in Example 3.

In a thin film inductor element obtained in Comparative Example 3 by similarly superposing magnetic thin films prepared by the procedure of Comparative Example 1, the magnetic thin films in the completed inductor element were found to have an anisotropic magnetic field which showed a discernible maximum increase of 2 kA/m relative to the original anisotropic magnetic field.

These examples represent the cases of having the relevant superposed magnetic thin films collectively patterned with a mixed solvent. When the magnetic layers and the insulating layers in the superposed magnetic thin films were patterned by alternately etching them with different etchants, the inductor element of Example 8 using magnetic thin films obtained by the procedure of Example 3 was found to show no discernible degradation of coercive force. Meanwhile, the inductor element of Comparative Example 4 using magnetic thin films obtained by the procedure of Comparative Example 1 was found to show a degraded coercive force of about 400 A/m. Thus, the latter inductor element failed to acquire ample soft magnetism. Thus, Comparative Example 4 failed to obtain a thin film magnetic element exhibiting fully satisfactory characteristics.

Figure 5A:
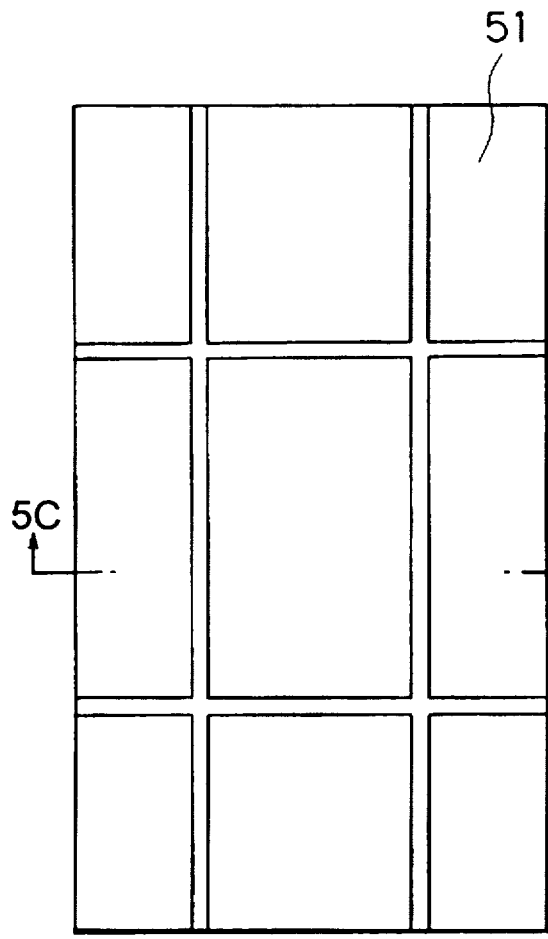
FIG. 5A, FIG. 5B, and FIG. 5C are diagrams each illustrating an example of the laminate construction of main elements in a thin film inductor element using the magnetic thin film of this invention.
Figure 5B:
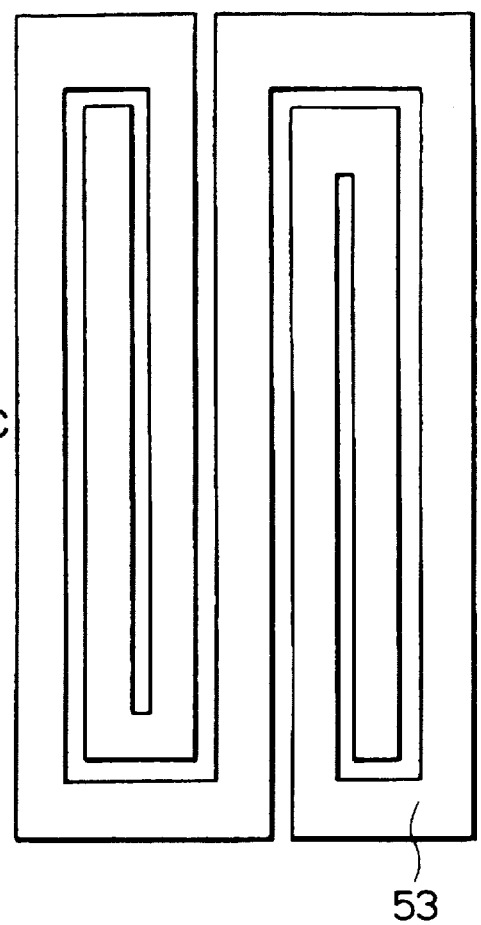
Figure 5C:
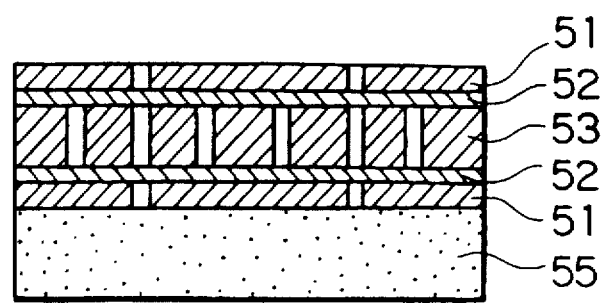

FIG. 5A, FIG. 5B, and FIG. 5C illustrate the laminate structure of main components of a thin film inductor element using a magnetic thin film of this invention. FIG. 5A is a plan view, in which 51 represents a patterned magnetic film. FIG. 5B is a plan view of coil part, and FIG. 5C is a cross section taken through FIG. 5A along the line 5C—5C, in which 51 represents a magnetic film, 52 an insulating layer, 53 a coil layer, and 55 a substrate.

As is clearly noted from the working examples cited above, this invention allows production of a magnetic thin film which exhibits low saturation magnetostriction constant, possesses uniaxial magnetic anisotropy, and excels in high saturation magnetization and soft magnetism.

It has been confirmed that, in a thin film magnetic element using this magnetic thin film, the magnetic characteristics inherent in the magnetic thin film are retained substantially intact.

In the comparative examples, the magnetic thin films showed high saturation magnetostriction constants and, in the thin film magnetic elements using these magnetic thin films, the magnetic characteristics of the magnetic thin films were varied. Thus, the thin film magnetic elements failed to acquire necessary magnetic characteristics.

As described in detail above, this invention concerns a magnetic film to be used in such planar magnetic elements as planar inductors and thin film magnetic heads. It provides a magnetic thin film which retains high saturation magnetization, soft magnetism, and ability to control inplane uniaxial magnetic anisotropy and, at the same time, exhibits a low saturation magnetostriction constant, and possesses magnetic characteristics not easily degraded by the occurrence of anisotropic stress, dispersion of the stress, or the variation thereof during or after the process for the manufacture of a planar magnetic element and a planar magnetic element using the magnetic thin film.

What is claimed is:

1. A magnetic thin film comprising:

a material with a composition according to the following chemical formula, $\{(Fe_{1-x}Co_x)_{1-y}(B_{1-z}X_z)_y\}_{1-a}RE_a$, wherein X represents at least one element selected from among the Group IVB elements in the IUPAC version of the Periodic Table, RE represents rare earth elements including Sm, and $0<x<1$, $0<z<1$, $0.05<y<0.36$, and $0<a\leqq0.1$;

wherein at least a part of said magnetic thin film is amorphous; and wherein said magnetic thin film is characterized by in-plane uniaxial magnetic anisotropy.

2. The magnetic thin film according to claim 1, wherein Sm accounts for a proportion of not less than 50% of the total number of mols of said rare earth elements contained in the film.

3. The magnetic thin film according to claim 1, wherein the rare earth elements contained in the film substantially comprise Sm.

4. The magnetic thin film according to claim 1, wherein the thin film is formed of a hetero-amorphous region.

5. The magnetic thin film according to claim 1, wherein the thin film partially contains a crystalline region.

6. The magnetic thin film according to claim 1, wherein thin film has saturation magnetostriction constant of not more than $4.0\times10^{-5}$.

7. A thin film magnetic element comprising:

a substrate;

a magnetic layer formed on said substrate;

an insulating layer formed on said magnetic layer;

a coil layer formed on said insulating layer;

wherein a magnetic thin film forming said magnetic layer comprises a material with a composition according to the following chemical formula $\{(Fe_{1-x}Co_x)_{1-y}(B_{1-z}X_z)_y\}_{1-a}RE_a$, wherein X represents at least one element selected from among the Group IVB elements in the IUPAC version of the Periodic Table, RE represents rare earth elements including Sm, and $0<x<1$, $0<z<1$, $0.05<y<0.36$, and $0<a\leqq0.1$; and wherein at least a part of said magnetic thin film is amorphous.

8. The thin film magnetic element according to claim 7, wherein Sm accounts for a proportion of not less than 50% of the total number of mols of said rare earth elements contained in said magnetic film.

* * * * *

UNITED STATES PATENT AND TRADEMARK OFFICE
CERTIFICATE OF CORRECTION

PATENT NO.: 5,780,177

DATED: July 14, 1998

INVENTOR(S): Hiroshi Tomita et al.

It is certified that an error appears in the above-identified patent and that said Letters Patent is hereby corrected as shown below:

Title page, Item [54], in the title, line 2, "MAGENETIC" should read --MAGNETIC--.

Claim 7, column 12, line 17, after "formula" insert --,--.

Signed and Sealed this

Seventh Day of September, 1999

Q. TODD DICKINSON

*Attest:*

*Attesting Officer*       *Acting Commissioner of Patents and Trademarks*